May 29, 1951    J. G. OETZEL    2,554,874
MAGNETIC FRICTION ELEMENT

Filed Jan. 21, 1949    5 Sheets-Sheet 1

May 29, 1951

J. G. OETZEL 2,554,874

MAGNETIC FRICTION ELEMENT

Filed Jan. 21, 1949

INVENTOR
John George Oetzel
By Carlson, Pitzner, Hubbard + Wolfe
ATTORNEYS

May 29, 1951 J. G. OETZEL 2,554,874
MAGNETIC FRICTION ELEMENT

Filed Jan. 21, 1949 5 Sheets-Sheet 3

Fig. 5

INVENTOR
John George Oetzel
By Carlson, Pitzner, Hubbard & Wolfe
ATTORNEYS

May 29, 1951 J. G. OETZEL 2,554,874
MAGNETIC FRICTION ELEMENT
Filed Jan. 21, 1949 5 Sheets-Sheet 4

INVENTOR
John George Oetzel
By Carlsen, Pitzner, Hubbell
ATTORNEY

May 29, 1951  J. G. OETZEL  2,554,874
MAGNETIC FRICTION ELEMENT
Filed Jan. 21, 1949  5 Sheets-Sheet 5

INVENTOR
John George Oetzel
By Carlson, Pitzner, Hubbard & Wolfe
ATTORNEYS

Patented May 29, 1951

2,554,874

UNITED STATES PATENT OFFICE 2,554,874

MAGNETIC FRICTION ELEMENT

John George Oetzel, Beloit, Wis., assignor to Warner Electric Brake & Clutch Company, a corporation of Illinois Application January 21, 1949, Serial No. 71,878

26 Claims. (Cl. 192—107)

This invention relates to a friction element for use in a clutch or brake in which annular friction rings are brought into axial gripping engagement by the energization of a magnetic coil on one of the elements. This invention is more particularly concerned with the mounting of a plurality of magnetic segments which form the rotary armature ring of the clutch or brake.

The primary object is to provide a novel and rugged mounting for holding magnetic segments in a common plane under the varying temperature conditions encountered in service use while at the same time providing for rapid dissipation of the frictional heat resulting from gripping engagement of the elements.

A more detailed object is to provide a mounting of the above character in which reinforcing ribs bent out of a metal supporting ring are themselves utilized advantageously to induce a surrounding fluid such as air to flow outwardly along the heated metal parts and cool the latter rapidly.

The invention also resides in the novel construction of the fan blades to provide rigidity of the segment support, in the manner of attaching the magnetic segments to provide for rapid conduction of the frictional heat directly to the segment support, and in the manner of stiffening the supporting ring for operation thereof at relatively high speed.

Other objects and advantages of the invention will become apparent from the following detailed description taken in connection with the accompanying drawings, in which:

While the invention is susceptible of various modifications and alternative constructions, I have shown in the drawings and will herein describe in detail the preferred embodiment. It is to be understood, however, that I do not intend to limit the invention by such disclosure but aim to cover all modifications and alternative constructions falling within the spirit and scope of the invention as expressed in the appended claims.

In the drawings, the invention is shown for purposes of illustration incorporated in an electromagnetic friction brake comprising generally an annular magnet ring 10 bolted to a stationary support 11 and a rotary armature 12 adapted to be drawn into axial gripping engagement with the magnet upon energization of a coil 13 disposed between the magnet poles 14. The end faces of the latter are spanned by the armature and are substantially flush with a friction facing 15 disposed between and supported by the magnet poles. The armature is carried by a collar 17 fast on a shaft 18 which projects along the axis of the magnet and armature.

The armature proper comprises a series of segmental plates 19 of magnetic material arranged end to end around the magnet face and individually secured to a supporting disk 20 herein composed of relatively thin sheet metal. The latter is substantially wider than the segments 19 and is supported from the collar 17 by a plurality of angularly spaced shouldered pins 16 which in the form shown in Figs. 1 to 4 project through bushings 21 pressed into holes in the disk and in a drive ring 22 copper brazed to the disk at spaced points around the latter. The ring 22 is disposed on the same side of the disk 20 as the segments 19, and, being secured integrally thereto, effectually reinforces the inner periphery of the disk.

Attachment of the segments to the disk 20 is effected in a novel manner which provides for the rapid dissipation of frictional heat by efficient conduction to the disk. To this end, each segment is first temporarily secured to the disk by spot-welding or in the form shown in Figs. 1 to 4 by rivets 24 formed by punching out the segment as indicated at 23. The projections thus formed on the back of the segment are extended through holes 25 in the disk and their ends are peened over to rivet the two together and maintain a predetermined positional relation of the segment and the disk during brazing of the segments to the disk. The riveting is effected while the faces of the segments are supported on a flat surface and therefore in a common plane.

The assembly thus formed is heated in a neutral atmosphere to cause a layer of metal of higher heat conductivity than either the plates 19 or the disk 20 placed in a hole 26 in the disk to flow in between the back of each plate 19 and the flat backing portion of the disk 20. Thus, the disk and the plate are united in intimate heat conducting relation over an area 27 (Fig. 2) by a thin layer of metal, such as copper, which is adapted to conduct heat rapidly from the plates into the disk 20.

In accordance with one aspect of the present invention, the metal of the disk 20 is deformed so as to increase the disk rigidity, the deformations being of novel shape and so arranged as to induce rapid circulation of a surrounding fluid such as air across the surfaces of the disk and the segments. Herein, part of the reinforcement is obtained by bending the outer peripheral margin of the disk axially away from the segments to form a beveled flange 28 and then reversely to form a cylindrical edge 28ª overlapping and disposed close to the outer edge of the segments. Thus, the outer peripheral portion of the disk constitutes an integral ring of substantial rigidity.

Opposite the space between each adjacent pair of segments, angularly spaced segmental portions of the disk 20 are depressed axially away from the backs of the segments to form ribs 29 which extend from a point near the inner peripheral edge of the disk to a point adjacent the peripheral flange 28 but short of the outer edge of the disk so as not to detract from the rigidity of the flange. To this end, the metal of the disk is broken as indicated at 29ª (Fig. 1) at the outer ends of the ribs 29 so that each rib is open at radially spaced points, in this instance at the outer and inner ends of the rib. Those ribs which fall on radii through the supporting bushings 21 are stopped short of the latter and similarly open at their inner ends. The ribs are square sided and of generally segmental shape and approximately of the same width as the intervening flat portions of the disk to which the central parts of the segments 19 are brazed as described above.

By thus deforming the metal both radially and circumferentially without, except for the small holes 26, interrupting the circumferential continuity of the metal at any point, the disk, although formed from relatively thin sheet metal, is very rigid and thus reinforced against warping under the temperature changes to which it is subjected in service use. As a result, the armature ring formed by the connected segments 19 is maintained substantially flat at all times. These flat portions are angularly spaced apart the same as the ribs 29 and themselves form radial ribs between the ribs 29 but projecting axially in the opposite direction and from the opposite side of the disk.

By depressing the disk 20 to form the ribs 29 on the outer side of the disk, radially extending channels 30 are formed in the other side of the disk. The unsupported end portions of each pair of adjacent segments 19 project across one of these channels 30 and cooperate therewith to form a passage through which air is induced to flow outwardly by centrifugal action during rotation of the armature assembly. As shown by the arrows in Fig. 3, this air enters the inner open end 31 of the passage from both sides of the disk and is discharged from the outer open end 32 where it strikes the bevel 28 in the peripheral flange. By virtue of the particular shape of the latter, the air hugs the metal surface and follows around the bend and axially along the flange 28ª as indicated by the arrow. Since the openings at opposite ends of the channels 30 are free and unobstructed and disposed on the side of the disk opposite the segments, a large volume of air will be circulated through the channels.

The ribs 29 also constitute cooling fins and provide for efficient circulation of air along the side of the disk 20 opposite the armature segments 19. This is because at least part of each rib is left uncovered and projects from the disk 20 so as to act as a fan blade in creating turbulence in the air. Also, the air in the radial spaces defined by the adjacent ribs is subjected to centrifugal force and thus caused to flow outwardly across the disk. Thus, the reinforcing ribs, when formed as above described, not only induce the flow of air across both sides of the disk but also locate the paths of the air streams so that the air is used most efficiently in dissipating the heat developed during gripping engagement of the friction faces of the magnet and armature. Since the segments 19 are composed entirely of metal, the major portion of this heat will be conducted through the segments to the backs thereof. Part of this heat will be radiated directly to the air streams created by the channels 30 which are formed in part by the segments themselves in which the frictional heat originates. Because of the substantial area of the copper braze layer 27, the remainder of the heat is conducted rapidly through the copper braze to the flat portions of the disk and to the ribs 29 all of which parts are cooled by direct contact with the air streams flowing outwardly along both sides of the disk.

The armature unit formed as above described is extremely simple in construction because the supporting disk is a sheet metal stamping and because the assembly of the segments thereon may be effected in a simple pressing operation followed by brazing. At the same time, the unit, in spite of its relatively light weight, possesses the rigidity required to maintain the desired flatness of the armature face under most conditions while minimizing the temperatures attained in service used by efficient cooling of the parts.

In some instances, it is desirable to constantly urge the armature toward the magnet and maintain continuous but light mechanical contact between friction faces of the two. This may be accomplished through the provision of compression springs 33 seated in recesses in the collar 17 with their projecting ends bearing against the inner ends of certain of the ribs 29.

To facilitate trimming of the internal periphery of the stamping from which the disk 20 is formed, it is desirable to terminate the inner ends of the ribs 29 short of the inner edge of the disk. In such a case, the metal may be broken along lines 29b (Fig. 5) spaced outwardly from the disk edge to leave a narrow flat band of metal around the disk.

Figure 1:
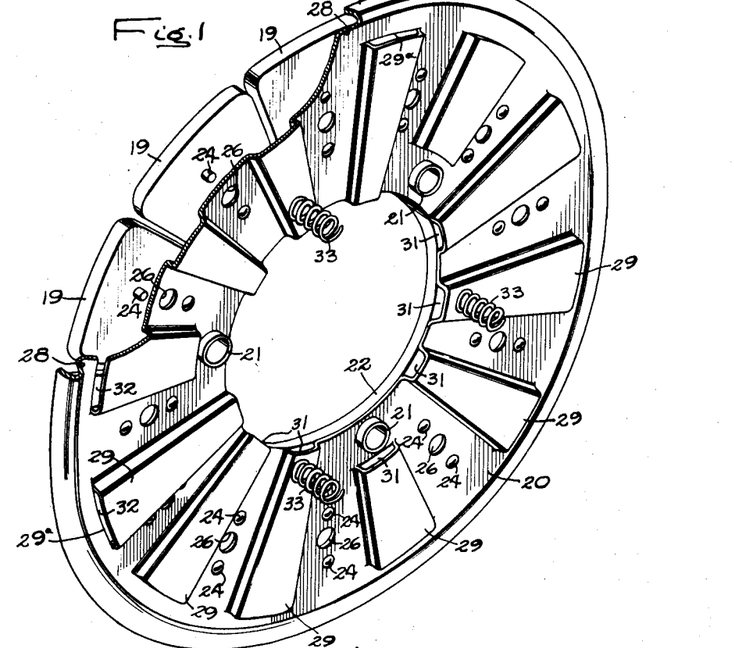
Figure 1 is a perspective view of a magnetic friction element embodying the novel features of the present invention.
Figure 2:
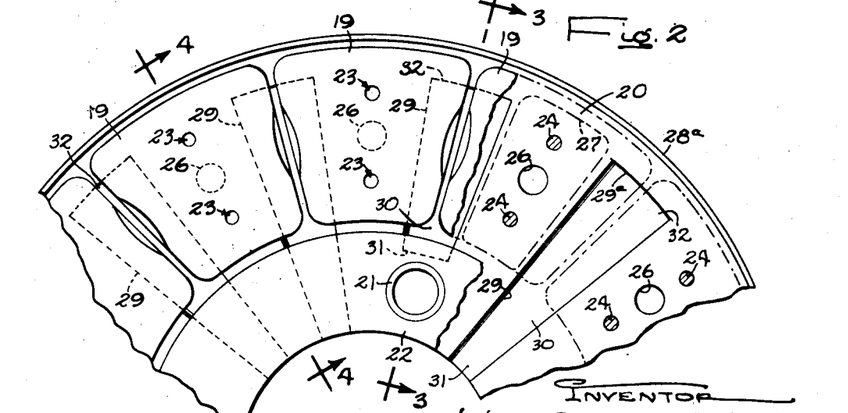
Fig. 2 is a fragmentary face view of the magnetic element.
Figure 3:
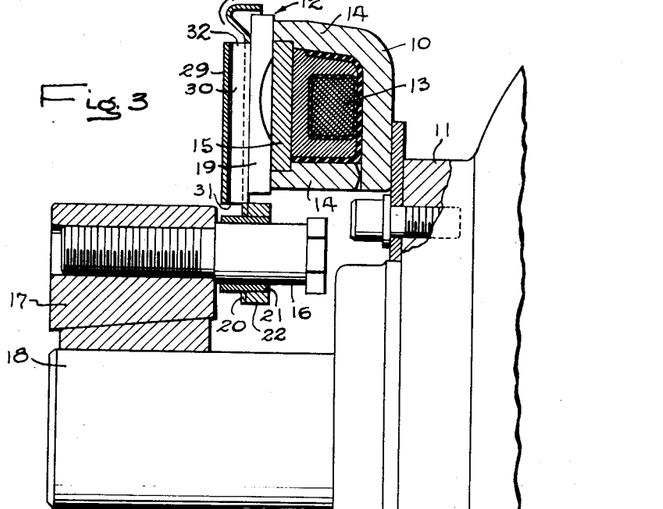
Fig. 3 is a diametrical sectional view taken along the line 3—3 of Fig. 2 of a friction brake including the improved friction element.
Figure 4:
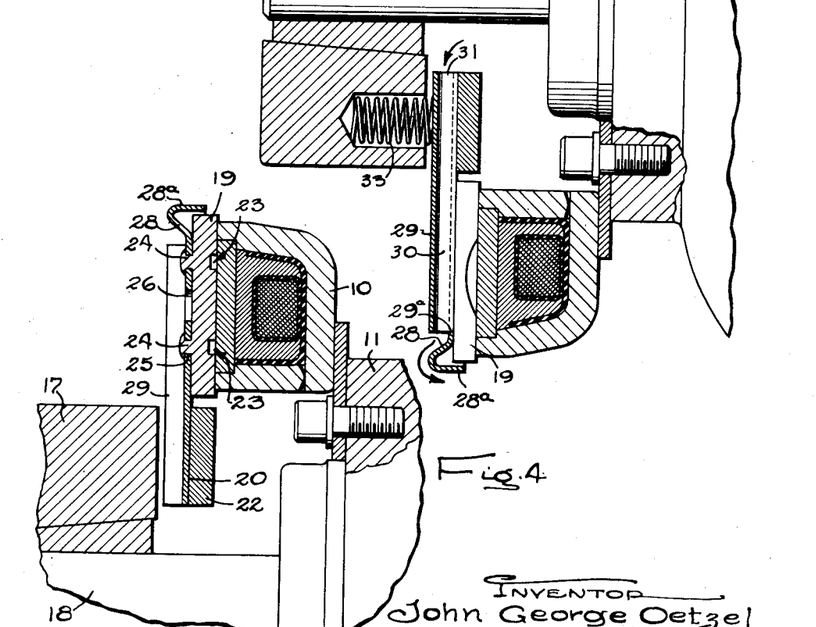
Fig. 4 is a section taken along the line 4—4 of Fig. 2.
Figure 5:
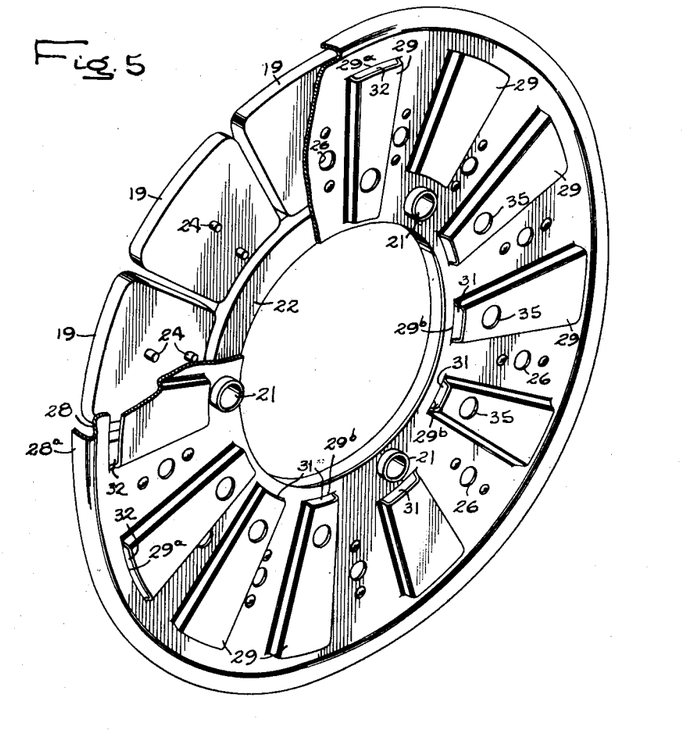
Fig. 5 is a perspective view similar to Fig. 1 showing a minor modification.

For applications in which the mounting for the armature unit is disposed too close to the inner ends of the ribs 29 so as to preclude the entry of air to the latter in volumes sufficient for adequate cooling, holes 35 may be punched in the ribs 29 as shown in Fig. 5. Such holes are preferably located near the inner ends of the ribs.

In the forms of the invention described above, the armature segments 19 are offset axially from and overhang the plane of the supporting disk 20 so that the centrifugal force resulting from rotation of the disk at high speed tends to bend the disk. To reinforce the disk and insure perfect flatness of the friction face of the armature under such conditions, the invention contemplates a further stiffening of the assembly in the manner shown in Figs. 6, 7 and 8. For this purpose, additional ribs in the form of metal bars 37 are welded or otherwise rigidly secured against the outer surface of disk 20 in radial positions and about midway between the ribs 29. Each bar extends across substantially the full radial width of the disk and is somewhat thicker than the ribs 29. A flat ring 36, preferably narrower than the disk 20, is then secured as by welding against the outer faces of the bars so as to unite the disk, the bars, and the ring 36 into a rigid truss-like structure. The resistance of the ring to bending under centrifugal forces is thus increased not only because of the greater stiffness of the unit but also because of the improved distribution of the weights of the parts relative to the plane of the supporting disk 20.

Figure 6:
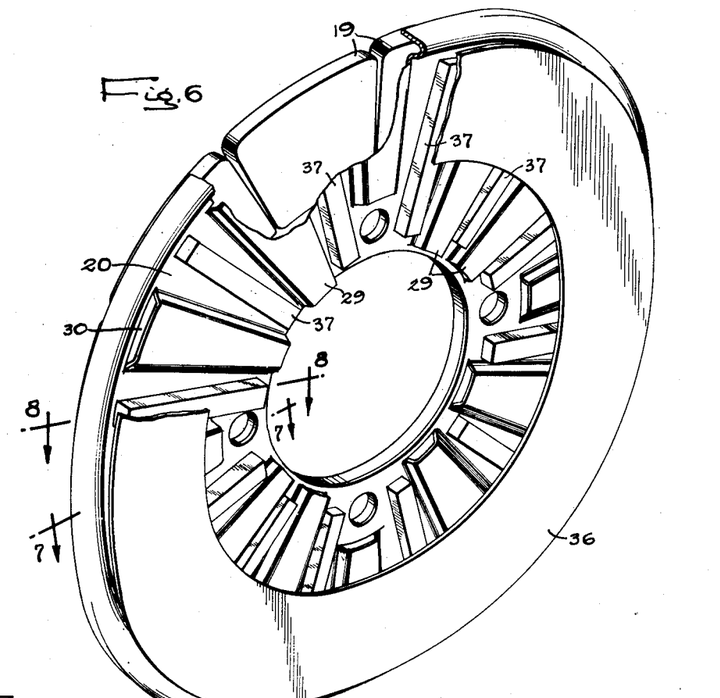
Fig. 6 is a perspective view similar to Fig. 1 showing another modification.
Figure 7:
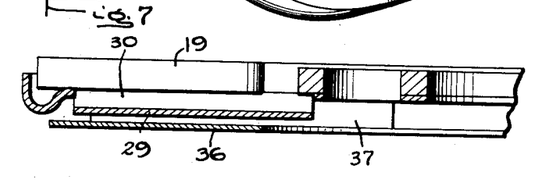
Figs. 7 and 8 are fragmentary sections taken respectively along the lines 7—7 and 8—8 of Fig. 6.
Figure 8:
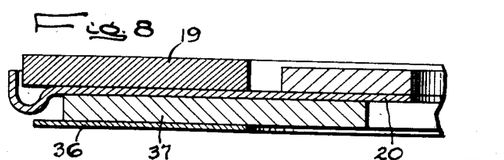

In addition, the ring 36 forms a side wall for the outer end portions of the air channels defined by the disk 20 and the adjacent ribs 29. As a result the action of these channels in inducing the flow of cooling air outwardly across the supporting disk is improved considerably.

Figure 9:
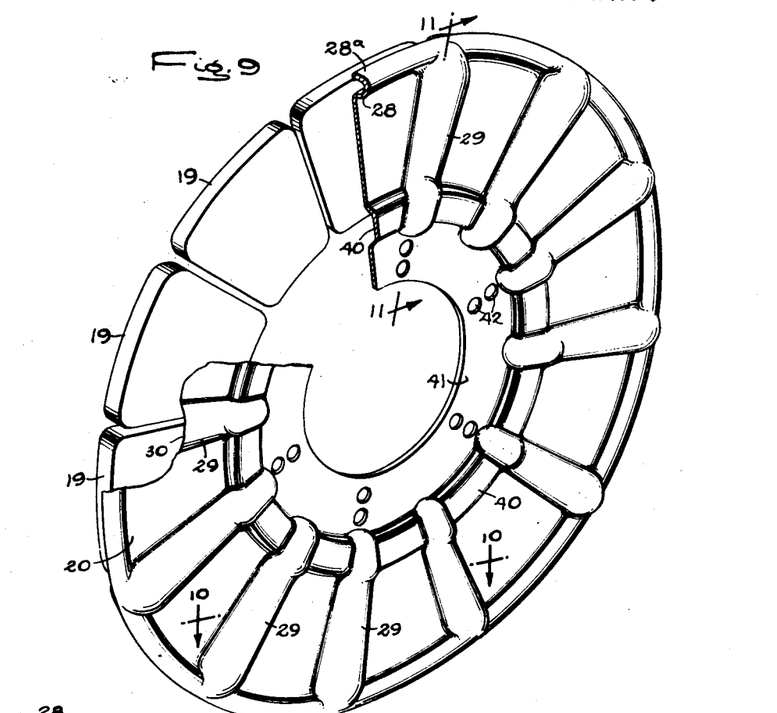
Fig. 9 is a fragmentary perspective view similar to Fig. 1 showing another modification.
Figures 10, 11:
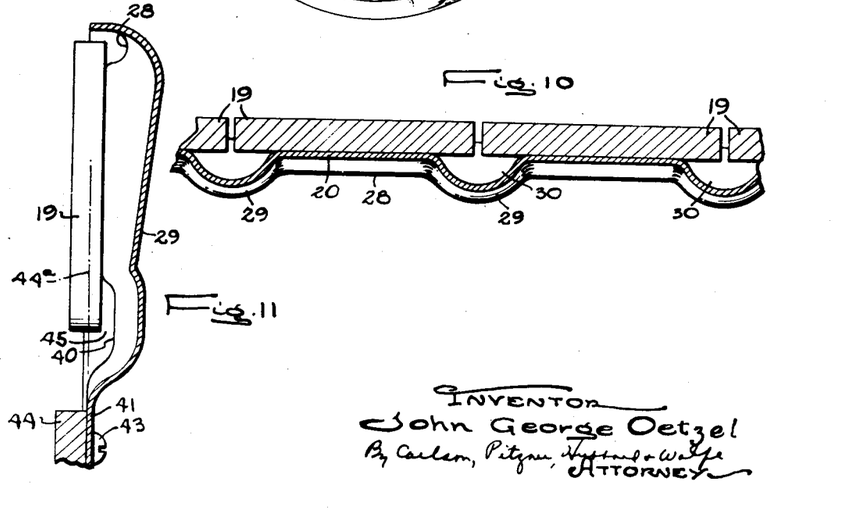
Figs. 10 and 11 are fragmentary sections taken respectively along the lines 10—10 and 11—11 of Fig. 9.

Other variaations may be made in the construction of the supporting disk 20 to obtain optimum rigidity and simplicity while providing for efficient dissipation of the frictional heat. For example, the ribs 29 may be of rounded cross section as shown in Figs. 9, 10 and 11, with their outer ends curved toward the disk proper and merged with the beveled flange 22 at the outermost edge of the disk. At their inner ends, which terminate inwardly beyond the inner edge of the segments 19, the ribs 29 merge with circumferentially extending ribs 40 which are formed out of the disk 20 by pressing arcuate parts of the latter outwardly and axially to a depth somewhat less than that of the radial ribs 29. Preferably, the latter are made progressively deeper toward their outer ends to effect additional reinforcement.

As in the forms first described, the disk 20 is supported from its inner peripheral edge portion 41 which, in the present instance, is left relatively flat and formed at angularly spaced points with holes 42 to receive screws 43 by which the disk is clamped against a rotating hub 44. To minimize the danger of distorting the disk 20 and of bending the supporting portion 41 axially, under the substantial centrifugal force developed during rotation of the armature at high speed, the edge portion 41 is offset axially from the plane of the outer or deformed part of the disk and in the direction of the segments 19. The degree of the offset is such as to locate the plane of the edge portion 41 approximately coincident with the center of gravity of the complete unit. Thus, the edge 41 is disposed in a plane 44ª which extends through the segments 19 parallel to the friction faces thereof and is offset inwardly from the center plane so that the weight of the outer parts of the segments is approximately equal to the weight of the inner parts of the segments combined with the overhanging weight of the disk 20. More particularly, the plane 44ª is located at about the center of the range through which the center of gravity of the unit shifts during wearing off of the armature in service use. With the disk thus supported in a plane substantially coincident with the line of action of the centrifugal force on the rotating unit, the latter does exert a substantial bending movement of the disk. This unit is thus suited for use at relatively high speeds of rotation.

The modification shown in Fig. 9 operates in the manner previously described to effect outward circulation of large volumes of air between the disk and the segments and dissipate frictional heat rapidly. In this instance, the air flowing through the channels 30 enters an inlet of substantial area formed by the inner rounded ends of the ribs 29 and the adjacent communicating parts of the groove 45 defined by the arcuate ribs 40. In a similar way, the arcuate ribs 28 define a groove which cooperates with the outer rounded ends of the ribs 29 to form the air channel outlets and direct the discharged air across the outer edges of the segments 19. Thus, the flow of cooling air is confined to the inner side of the disk 20 which is desirable in certain installations.

This application is a continuation-in-part of my copending application Serial No. 754,213, filed June 12, 1947, and now abandoned.

I claim as my invention:

1. A magnetic friction element comprising a flat metal disk having an outer peripheral flange comprising a bevel projecting axially in one direction and a cylinder bent reversely at the outer edge of said bevel, angularly spaced radially disposed ribs pressed out of said disk and projecting from the disk in the same direction as said flange so as to form channels on the opposite side of the disk, said ribs stopping short of said flange bevel and opening radially at opposite ends so as to form channels along which air is induced to flow outwardly during rotation of the disk, a plurality of segments of magnetic material arranged end to end around the channeled side of said disk and each lying against a flat portion of the disk intervening between adjacent ones of said channels with the outer margin of each segment disposed adjacent said flange bevel, and means intermediate the margins of each segment rigidly securing the latter to said disk.

2. A magnetic friction element comprising a flat sheet metal disk having a generally cylindrical reinforcing rib projecting from one side of said disk at the outer peripheral edge thereof, said disk having angularly spaced portions depressed axially to form radially disposed ribs projecting from said disk in the same direction as said reinforcing rib, said ribs stopping short of said flange at their outer end and opening radially at opposite ends so as to form channels along which air is induced to flow outwardly and across the outer surface of said reinforcing rib during rotation of the disk, a plurality of segments of magnetic material arranged end to end around said disk and each lying against a flat portion of said disk intervening between adjacent ones of said channels, and means rigidly securing an intermediate portion of each segment rigidly to the disk.

3. A magnetic friction elment comprising a flat metal disk having a bevel flange around its outer preiphery, angularly spaced portions of said disk within said flange being depressed axially to form radially extending channels on the side of the disk opposite said flange with each channel terminating at a circumferential split in the disk defining an opening from which air may be discharged radially and outwardly from the channel against said flange, and a plurality of segmental plates arranged end to end around the side of said disk opposite said opening and individually attached to the disk between adjacent ones of said channels.

4. A magnetic friction element comprising a sheet metal disk having a continuous flange around its outer periphery, angularly spaced portions of said disk being depressed axially to form outwardly extending channels terminating short of said flange in an opening in said disk, and a plurality of magnetic plates arranged end to end around said disk and individually attached to the latter at points disposed between said channels, said disk opening being arranged for the outward discharge of air from the side of the disk opposite said segments.

5. A magnetic friction element comprising a sheet metal disk having angularly spaced portions depressed axially to form radially extending ribs on one side of the disk and stopping short of the outer periphery of the disk without interrupting the circumferential continuity of the metal of the disk, the depressions in the disk constituting channels each open at its inner and outer ends, a plurality of segmental plates arranged in an annular series around the depressed side of said disk, and means rigidly attaching said plates to the portions of the disk intervening between said ribs with the end portions of each plate projecting across said channels.

6. A magnetic friction element comprising a generally flat metal disk having angularly spaced segmental portions depressed axially to reinforce the disk and form radially elongated channels extending over the major radial width of the disk, the portions of the disk intervening between said depressions being flat, a plurality of flat segments of magnetic material arranged end to end in an annular series around said disk with opposite ends projecting at least partially across the adjacent channels, and means rigidly securing said flat portions against the backs of said segments.

7. A magnetic friction element comprising a generally flat sheet metal disk having angularly spaced segmental portions depressed axially to form elongated radially extending ribs and intervening channels without interrupting the circumferential continuity of the metal of the disk, a plurality of segmental plates of a radial width narrower than the radial length of said channels, said plates being arranged in an annular series around the other side of said disk and means rigidly attaching said plates to the flat portions of the disk intervening between said ribs, said depressed portions and said segments forming radially extending tubular passages open at their inner and outer ends whereby to cause a flow of air outwardly through the channels.

8. A magnetic friction element comprising a sheet metal disk having angularly spaced portions depressed axially to reinforce the disk and form radially elongated surfaces exposed at their inner and outer ends and constituting fan blades operable to induce an outward flow of air across said disk during rotation of the disk, the portions of the disk intervening between the depressions being substantially flat, a plurality of flat segments of magnetic material arranged end to end in an annular series around said disk with each segment lying against one of said flat portions and with the opposite ends of the segments projecting at least partially across the adjacent depressed portions, and means integrally joining said flat portions in intimate heat-conducting relation to the backs of said segments.

9. A magnetic friction element comprising a plurality of generally flat segments of magnetic material arranged end to end in an annular series, a disk axially spaced from said segments and adapted to be supported for rotation about the disk axis, a plurality of angularly spaced radial ribs rigid with and projecting from one face of said disk into abutment with the backs of said segments, the opposed sides of adjacent ribs extending substantially across the full width of said segments and cooperating with the latter and the intervening portion of the disk from a radially elongated open ended passage through which fluid is induced to flow outwardly during rotation of the disk, and means rigidly securing each of said ribs to the abutting segment at points radially spaced apart.

10. A magnetic friction element comprising a plurality of segmental magnetic plates arranged end to end in an annular series, a metal disk rigidly secured to each of said plates and supporting the latter in a common plane, and deformations punched in said disk to impart rigidity to the latter and form elongated radially extending cooling fins at least as long radially as the radial width of said plates and operable to intercept the air during rotation of said disk.

11. A magnetic friction element comprising a sheet metal disk having angularly spaced segmental portions depressed axially to form radially elongated and outwardly extending ribs on one side of the disk, the sides of said ribs on each side of said disk operating to induce the flow of a surrounding fluid outwardly across both sides of the disk when the latter is rotated, and a plurality of segmental plates arranged in an annular series around the other side of said disk and rigidly attached to the flat portions of the ring intervening between said depressed portions.

12. A magnetic friction element comprising a supporting disk, segments of magnetic material arranged end to end around said disk in an annular series and with their backs lying against the disk, two spaced projections on the back of each segment projecting through holes in said disk with the heads of the projections peened over to rivet the disk and segments rigidly together with the exposed faces of said segments lying in a common plane, and a layer of a metal of higher heat conductivity than said segments or said disk integrally joining the abutting surfaces of said segments and said disk.

13. A magnetic friction element comprising, a supporting disk, segments of magnetic material arranged end to end around said disk in an annular series and with their backs lying against the disk, means on said segments interengaging said disk and rigidly holding the two together with the exposed faces of said segments lying in a common plane, and a layer of a metal of higher heat conductivity than said segments or said disk integrally joining the abutting surfaces of said segments and said disk.

14. A magnetic friction element comprising, a supporting disk having a central opening and a continuous flange formed out of the outer periphery of the disk, said disk being depressed along angularly spaced radially extending lines to form angularly spaced ribs on one side of the disk, segments of magnetic material arranged end to end around the outer portion of said disk on the other side thereof with the backs of the segments lying against and joined to the portions of the disk intervening between said ribs, and a reinforcing ring lying in the plane of said segments and secured rigidly against said disk around the inner peripheral margin thereof, said ring having annularly spaced holes therein for receiving pins for supporting said disk.

15. A magnetic friction element comprising, a supporting disk having a central opening and an outer peripheral reinforcing flange, said disk being depressed along angularly spaced radially extending lines to form angularly spaced ribs on one side of the disk with the outer ends of the ribs stopping short of said flange, segments of magnetic material arranged end to end around the outer portion of said disk on the other side of the latter with the backs of the segments lying against and joined to the portions of the disk intervening between said ribs, and a reinforcing ring extending around and secured rigidly against said disk around the inner peripheral margin thereof on said other side of the latter.

16. A magnetic friction element comprising a sheet metal disk having angularly spaced portions depressed axially to reinforce the disk and form radially elongated surfaces exposed at their inner and outer ends and constituting fan blades operable to induce an outward flow of air across said disk during rotation of the disk, the radially elongated portions of said disk between said blades being substantially flat, a plurality of flat segments of magnetic material arranged end to end around said disk with the back of each segment lying against one of said flat portions over substantially the full radial width of the segments, and a thin layer of metal of substantially higher heat conductivity than said disk and segments integrally uniting the abutting areas of the segments and said flat disk portions.

17. A magnetic friction element comprising a sheet metal disk with a central opening having annularly spaced segmental portions axially depressed to form elongated radial ribs on both sides of the disk, segments of magnetic material arranged end to end around said disk between said ribs and integrally secured to the ribs on one side of the disk, said ribs having generally parallel side walls extending substantially across the full width of said segments and cooperating with the latter to define channels having openings at their inner ends disposed inwardly beyond the inner edges of said segments, and arcuate reinforcing elements rigidly connecting said radial ribs at the inner and outer peripheries of said disk while leaving said channels open at their ends for the free outward flow of air therethrough.

18. A magnetic friction element comprising a sheet metal disk with a central opening having annularly spaced segmental portions axially depressed to form elongated radial ribs on both sides of the disk, segments of magnetic material arranged end to end around said disk between said ribs and integrally secured to the ribs on one side of the disk, said ribs having generally parallel side walls extending substantially across the full width of said segments and cooperating with the latter to define channels having openings at their inner ends disposed inwardly beyond the inner edges of said segments.

19. A magnetic friction element comprising, a metal disk having annularly spaced segmental portions axially depressed to form elongated radially extending ribs on both sides of the disk, said ribs defining between them inwardly and outwardly opening channels and acting during rotation of the disk as fan blades for inducing the flow of air outwardly through the channels on both sides of the disk, segments of magnetic material arranged end to end around said disk and secured to the ribs on one side of the disk, radially extending bars thicker than said ribs secured to the opposite side of said disk between the ribs thereof, and a ring extending around and rigidly secured against said bars to unite the bars, said disk, and the ring into a rigid truss structure.

20. A magnetic friction element comprising, a metal disk having annularly spaced segmental portions axially depressed to form elongated radially extending ribs on both sides of the disk, said ribs defining between them inwardly and outwardly opening channels and acting during rotation of the disk as fan blades for inducing the flow of air outwardly through the channels on both sides of the disk, segments of magnetic material arranged end to end around said disk and secured to the ribs on one side of the disk, bars secured to the opposite side of said disk and radially disposed between the ribs on the disk, and a flat ring extending around and rigidly secured against said bars.

21. A magnetic friction element comprising, a metal disk having elongated radially extending ribs rigid with one side thereof and defining on the other side inwardly and outwardly opening channels, the walls of said channels acting during rotation of the disk to induce the flow of air outwardly through the channels, segments of magnetic material arranged end to end around said other side of said disk and rigidly secured thereto, and a flat ring extending around and rigidly secured against said ribs to unite the ribs, said disk, and the ring into a rigid truss structure.

22. A magnetic friction element comprising, two spaced coaxially arranged metal disks one wider than the other, means by which said wider disk may be supported from its inner periphery, segments of magnetic material arranged end to end around the outer surface of said wider disk and rigidly secured thereto, and radially extending ribs disposed between said disks and rigidly secured to both of the disks to unite the two into a rigid truss structure, said disks and the adjacent pairs of ribs forming between them air channels which are open at their inner and outer ends for the free circulation of air outwardly therethrough during rotation of the disks.

23. A magnetic friction element comprising, a disk adapted to be supported from its inner periphery for rotation about the disk axis, a plurality of segments of magnetic material arranged end to end around one side of said disk and rigidly secured to the latter, angularly spaced radially extending ribs rigid with the other side of said disk, and an arcuate member lying against and rigidly secured to the said ribs on the side thereof opposite said segments.

24. A magnetic friction element comprising a plurality of flat segments of magnetic material arranged end to end in an annular series, a disk radially wider than said segments and lying against and rigidly secured to each segment intermediate the edges thereof, the inner edge portion of said disk being offset axially to lie in the plane of said segments and adapted to be supported for rotation about the disk axis, ribs pressed axially out of the outer part of said disk between the points of connection of the segments and disk and providing radially elongated channels which extend across the backs of said segments and terminate at closed ends disposed short of the inner and outer edges of the disk, and arcuate ribs depressed axially in the same direction from the inner and outer peripheral portions of said disk and respectively joining the inner and outer ends of said radial ribs.

25. A magnetic friction unit comprising a plurality of flat segments of magnetic material arranged end to end in an annular series, a disk radially wider than said segments and lying against and rigidly secured to each segment intermediate the edges thereof, the inner edge portion of said disk being offset axially toward and beyond the backs of said segments and lying substantially in the plane of the center of gravity of the unit, ribs pressed axially out of said disk between the points of connection of the segments and disk and on the side of the latter opposite said segments, and means on said inner offset edge portion adapting the latter for attachment to a supporting part.

26. A magnetic friction element comprising a plurality of flat segments of magnetic material arranged end to end in an annular series, a disk radially wider than said segments and lying against and rigidly secured to each segment intermediate the edges thereof, means by which the inner edge portion of said disk may be supported for rotation about the disk axis, ribs pressed axially out of the outer part of said disk between the points of connection of the segments and disk and providing radially elongated channels which extend across the backs of said segments and terminate at closed ends disposed short of the inner and outer edges of the disk but open axially toward said segments and beyond the inner and outer edges thereof, and arcuate ribs depressed axially in the same direction from the inner and outer peripheral portions of said disk and respectively joining the inner and outer ends of said radial ribs, said arcuate ribs providing annular channels opening toward and extending around the inner and outer peripheries of said segments.

JOHN GEORGE OETZEL.

REFERENCES CITED

The following references are of record in the file of this patent:

UNITED STATES PATENTS

| Number    | Name   | Date          |
|-----------|--------|---------------|
| 2,024,328 | Batie  | Dec. 17, 1935 |
| 2,138,837 | Cadman | Dec. 6, 1938  |
| 2,395,905 | Oetzel | Mar. 5, 1946  |
| 2,421,757 | Oetzel | June 10, 1947 |